US012461809B1

(12) United States Patent
Rogers et al.

(10) Patent No.: US 12,461,809 B1
(45) Date of Patent: Nov. 4, 2025

(54) MESSAGE ERROR RECOVERY SYSTEM

(71) Applicant: State Farm Mutual Automobile Insurance Company, Bloomington, IL (US)

(72) Inventors: Brian Rogers, McLean, IL (US); Christopher Bernard Piwinsky, Bloomington, IL (US); Bert Michael Sanders, Bloomington, IL (US); Clete Rivers Blackwell, II, Dawsonville, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/760,818

(22) Filed: Jul. 1, 2024

(51) Int. Cl.
*G06F 11/00* (2006.01)
*G06F 11/07* (2006.01)

(52) U.S. Cl.
CPC ...... *G06F 11/0793* (2013.01); *G06F 11/0709* (2013.01)

(58) Field of Classification Search
CPC .................... G06F 11/0793; G06F 11/0709
USPC .......................................................... 714/18
See application file for complete search history.

(56) References Cited

U.S. PATENT DOCUMENTS 5,878,056 A * 3/1999 Black .................... H04L 1/1835
714/748
7,945,813 B1 * 5/2011 Watson ............... G06F 11/1443
714/17
2003/0105986 A1 * 6/2003 Elko .................... G06F 11/1443
714/4.11
2010/0161743 A1 6/2010 Krishnamurthi et al.

OTHER PUBLICATIONS

"Amazon Simple Queue Service: Developer Guide," Retrieved on Jul. 1, 2024 at <<https://www.docs.aws.amazon.com/AWSSimpleQueueService>>, Amazon Web Services, published May 2, 2024. pp. 1-377.
Kulkarni, "Dead Lettering in Google Cloud Pub/Sub", retrieved on Jul. 1, 2024, at <<https://medium.com>>, published on Sep. 28, 2020, pp. 1-13.
Losio, "Amazon SQS Supports Reprocessing Messages from Dead-Letter Queue," retrieved on Jul. 1, 2024 at <<https://www.infoq.com/news/>>, Published Jun. 2023, pp. 1-5.

* cited by examiner

*Primary Examiner* — Jason B Bryan
(74) *Attorney, Agent, or Firm* — Lee & Hayes, P.C.

(57) ABSTRACT

An error may prevent a message delivery system from delivering an asynchronous message to a destination, for instance if the message contains an error or the destination is unreachable. When an error prevents the message delivery system from delivering an asynchronous message, a separate message error recovery system may add the message to a retry database. If the message contained the error, the message error recovery system may edit the message to correct the error, for instance based on input received via a user interface. When the error has been resolved, for instance via the editing of the message or because the destination has become reachable, the message error recovery system may send the original or edited message back to the message delivery system as a retry message. Due to the resolution of the error, the message delivery system may succeed in delivering the retry message to the destination.

20 Claims, 4 Drawing Sheets

MESSAGE ERROR RECOVERY SYSTEM

TECHNICAL FIELD

The present disclosure relates to transmission of asynchronous messages between computer-implemented elements, particularly with respect to retrying transmission of messages that initially failed to be delivered due to errors.

BACKGROUND

Different computer-implemented elements, such as software applications, systems, or processes, may exchange information via messages. Such messages may be synchronous or asynchronous.

Elements may communicate in real-time via synchronous messages, and/or may wait to perform further operations until synchronous messages are processed by the receiving elements. For example, a first process may request information from a second process via a synchronous message. After the first process sends the synchronous message, the first process may wait to perform further operations until a reply is received from the second process.

Asynchronous messages may allow elements to continue operating without waiting for sent messages to be processed by other elements. Accordingly, a first element may send an asynchronous message to a second element, and then continue performing other operations without waiting for a response from the second element. The asynchronous message may be delivered to the second element at a later time. The second element may process information that the first element included in the asynchronous message, at or after the later time at which the second process receives the asynchronous message. The first element and the second element may thus operate relatively independently by exchanging information via asynchronous messages, without waiting to perform additional operations until synchronous messages have been received and processed.

However, in some situations, errors may prevent delivery of asynchronous messages. As an example, if a first element sends an asynchronous message to a second element, a delivery system may attempt to deliver the asynchronous message to the second element up to a predefined number of times and/or for up to a predefined length of time. If the second element is offline or a network error causes the second element to be unreachable for a prolonged period of time, the delivery system may be unable to deliver the asynchronous message to the second element despite the delivery system performing multiple delivery attempts during that prolonged period of time. Alternatively, if the asynchronous message itself has an error, such as if the first element does not format the asynchronous message based on a format used by the second element, the second element may reject the asynchronous message regardless of how many times the delivery attempts are performed by the delivery system.

Errors preventing delivery of asynchronous messages may accordingly cause significant issues. For instance, if an asynchronous message sent by a first element is never received by the second element, the second element may never process information that the first element had attempted to convey via the asynchronous message. In some cases, the first element also may not be notified that the asynchronous message was not received by the second element, such the first element may operate under an erroneous assumption that the second element received and processed the information sent by the first element in the asynchronous message. Operating under such erroneous assumptions may cause the first element to process later data incorrectly, and/or lead to other problems.

As a non-limiting example, a front-end billing system may use asynchronous messages to send user payment information to a back-end payment processing system, such that the back-end payment processing system may later implement bill payments based on the user payment information conveyed by the asynchronous messages. When a user provides payment information to the front-end billing system, the front-end billing system may indicate to the user that the user's bill will be paid based on that payment information, and may send the user's payment information to the back-end payment processing system via an asynchronous message. However, if an error prevents the asynchronous message containing the user's payment information from being delivered to the back-end payment processing system, the back-end payment processing system may not be able to implement a payment for the user's bill even though the front-end billing system had informed the user that the user's bill would be paid. If and when the error is discovered, a representative or entity associated with the front-end billing system and/or the back-end payment processing system may need to reach out to the user and ask the user to resubmit payment information via the front-end billing system. This may lead to the back-end payment processing system being unable to perform operations as expected, lead to increased usage of the front-end billing system, lead to increased numbers of messages being sent over networks, and/or lead to other issues.

The example systems and methods described herein may be directed toward mitigating or overcoming one or more of the deficiencies described above.

SUMMARY

Described herein are systems and methods by which a message error recovery system may assist with recovering from errors that prevented one or more separate asynchronous message delivery systems from delivering asynchronous messages to one or more message destinations. An asynchronous message delivery system may be unable to deliver an asynchronous message to a message destination if the message itself contains an error, if an error causes the asynchronous message delivery system to be unable to reach the message destination, and/or due to other types of errors. If such an asynchronous message delivery system is unable to deliver a message and is no longer configured to attempt further delivery of the message, the separate message error recovery system may add the message to a retry database.

The message error recovery system may have a user interface and/or other elements by which the message may be edited in the retry database, for instance to correct errors in the message that had prevented the asynchronous message delivery system from delivering the message. After resolution of the error that prevented the asynchronous message delivery system from delivering the message, for instance due to editing of the message via the message error recovery system or because the message destination has come back online or is otherwise now reachable via a network, the message error recovery system may send the original or edited version of the message back to the asynchronous message delivery system as a retry message. Due to the resolution of the error, the asynchronous message delivery system may be likely to be able to successfully deliver the retry message to the message destination.

According to a first aspect, a computer-implemented method includes identifying, by a message error recovery system executed by a computing system including a processor, a message that an asynchronous message delivery system, different from the message error recovery system, is unable to deliver to a message destination due to an error. The computer-implemented method also includes adding, by the message error recovery system, the message to a retry database. The computer-implemented method further includes receiving, by the message error recovery system, instructions to retry transmission of the message based on resolution of the error. The computer-implemented method also includes sending, by the message error recovery system, and based on the instructions, a retry message corresponding to the message to the asynchronous message delivery system. The asynchronous message delivery system delivers the retry message to the message destination based on the resolution of the error.

According to a second aspect, a computing system includes one or more processors, and memory storing computer-executable instructions associated with a message error recovery system. The computer-executable instructions, when executed by the one or more processors, cause the one or more processors to identify a message that an asynchronous message delivery system, different from the message error recovery system, is unable to deliver to a message destination due to an error. The computer-executable instructions also cause the one or more processors to add the message to a retry database of the message error recovery system. The computer-executable instructions additionally cause the one or more processors to display a user interface that presents information associated with the message based on the retry database. The computer-executable instructions further cause the one or more processors to receive instructions, via the user interface, to retry transmission of the message based on resolution of the error. The computer-executable instructions also cause the one or more processors to send, based on the instructions, a retry message corresponding to the message to the asynchronous message delivery system. The asynchronous message delivery delivers the retry message to the message destination based on the resolution of the error.

According to a second aspect, one or more non-transitory computer-readable media storing computer-executable instructions associated with a message error recovery system. The computer-executable instructions, when executed by one or more processors of a computing system, cause the one or more processors to identify a message that an asynchronous message delivery system, different from the message error recovery system, is unable to deliver to a message destination due to an error. The computer-executable instructions also cause the one or more processors to add the message to a retry database of the message error recovery system. The computer-executable instructions additionally cause the one or more processors to display a user interface that presents information associated with the message based on the retry database. The computer-executable instructions further cause the one or more processors to receive instructions, via the user interface, to retry transmission of the message based on resolution of the error. The computer-executable instructions also cause the one or more processors to send, based on the instructions, a retry message corresponding to the message to the asynchronous message delivery system. The asynchronous message delivery system delivers the retry message to the message destination based on the resolution of the error.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
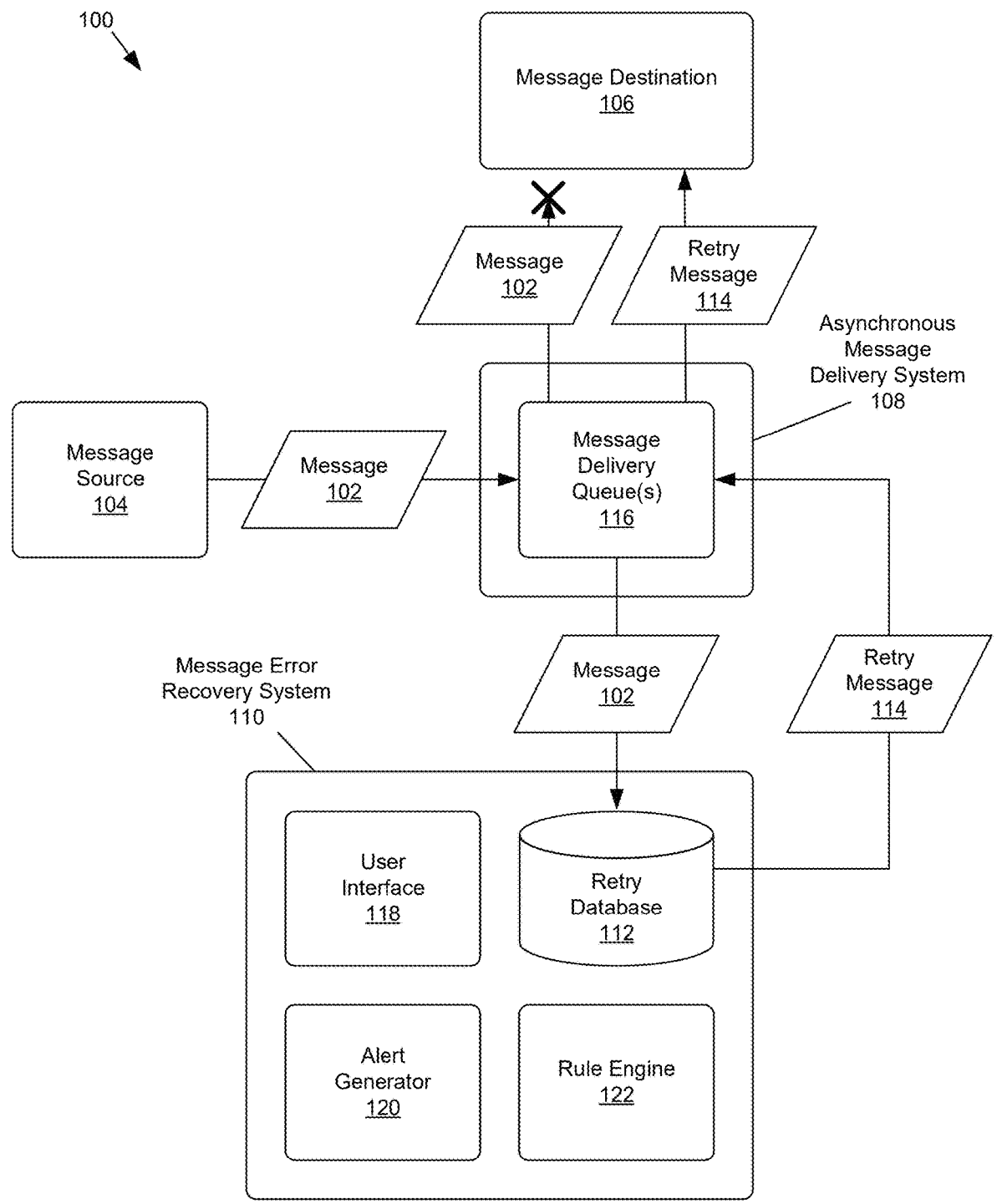
FIG. 1 shows an example computing environment in which a message is asynchronously transmitted from a message source to a message destination.

FIG. 1 shows an example computing environment 100 in which a message 102 is asynchronously transmitted from a message source 104 to a message destination 106. The message 102 may be a message that is sent by the message source 104 to an asynchronous message delivery system 108, such that the asynchronous message delivery system 108 may attempt to asynchronously deliver the message 102 to the message destination 106. If one or more errors prevent the asynchronous message delivery system 108 from delivering the message 102 to the message destination 106, a separate message error recovery system 110 may add the message 102 to a retry database 112.

After the message 102 is added to the retry database 112 of the message error recovery system 110, the message error recovery system 110 may generate and/or output a retry message 114 that corresponds to the message 102. The message error recovery system 110 may send the retry message 114 to the asynchronous message delivery system 108, such that the asynchronous message delivery system 108 may attempt to deliver the retry message 114 to the message destination 106.

In some examples, the message error recovery system 110 may send the retry message 114 to the asynchronous message delivery system 108 at a time at which an error that had prevented delivery of the message 102 is likely to have been resolved. In other examples, the retry message 114 may be an edited version of the message 102, such as a version of the message 102 that has been edited to correct an error in the message 102 that had prevented delivery of the message 102. Accordingly, if the retry message 114 is sent after resolution of an error that prevented delivery of the message 102, and/or if the retry message 114 has been edited to correct an error that had prevented delivery of the message 102, the asynchronous message delivery system 108 may be able to successfully deliver the retry message 114 to the message destination 106.

The message source 104 and the message destination 106 may be computer-implemented elements, such as software applications, systems, processes, and/or other elements. The message 102 sent by the message source 104 to the message destination 106 may be a data object, data blob, file, or other type of data or data structure that indicates one or more types of information. For example, the message 102 may be a message, notification, or other data formatted based on JavaScript Object Notation (JSON), Extensible Markup Language (XML), or another format.

The message 102 may have a payload that indicates information, and/or that encapsulates one or more documents or other types of data. As an example, if the message 102 is formatted based on JSON or another format that expresses information via attribute-value pairs, the payload of the message 102 may indicate one or more types of information via corresponding attribute-value pairs. The message 102 may also have a header, and/or have payload data, that indicates metadata and/or other information about the message 102, such as an address or identifier of the message source 104 that sent the message 102, an address or other identifier of the message destination 106 to which the message 102 is to be delivered, timestamp information indicating when the message 102 was generated and/or sent, and/or other information.

The message source 104 and the message destination 106 may be configured to interact asynchronously via messages 102 transmitted via the asynchronous message delivery system 108, such that the message source 104 and the message destination 106 may operate separately without waiting for interactions via synchronous communications. Accordingly, the message source 104 may send messages 102 indicating one or more types of information to the message destination 106, and that the message destination 106 may later process and/or evaluate information indicated by the messages 102.

As a non-limiting example, the message source 104 may be a front-end billing system that is configured to receive payment information from users. The message destination 106 may be a back-end payment processing system that processes bill payments. Accordingly, if a user provides credit card information or other payment information to the front-end billing system, the message source 104 may generate a message 102 indicating the user-provided payment information. The front-end billing system may submit the message 102 to the asynchronous message delivery system 108, such that the asynchronous message delivery system 108 may later attempt to deliver the message 102 to the back-end payment processing system. If the back-end payment processing system receives the message 102 from the asynchronous message delivery system 108, the back-end payment processing system may use the user-provided payment information indicated in the message 102 to implement a bill payment associated with the user. Accordingly, in this example, although a user may provide credit card information or other payment information to the front-end billing system, a corresponding bill payment may not be completed based on that payment information until after the back-end payment processing system receives a corresponding asynchronous message 102 sent by the front-end billing system.

In other examples, the message source 104 and the message destination 106 may be other types of computer-implemented elements that communicate via asynchronous messages 102. As an example, the message source 104 and the message destination 106 may associated with an insurance company. In this example, the message source 104 may send asynchronous messages 102 indicating information about insurance claims to the message destination 106, such that the message destination 106 may later process the insurance claims based on the information indicated by the messages 102. As another example, the message source 104 may send a message 102 including a document to the message destination 106, so that the message destination 106 may later receive and/or process the document.

Although the message source 104 may send an asynchronous message 102 to the message destination 106 as shown in FIG. 1, in some situations the message destination 106 may send a return asynchronous message 102 back to the message source 104 via the asynchronous message delivery system 108. Accordingly, in this situation, the original message destination 106 may become a message source 104 of a return message 102, and the original message source 104 may become a message destination for the return message 102.

The asynchronous message delivery system 108 may be a computer-implemented system, service, or platform that is configured to asynchronously deliver messages 102 from the message source 104 to the message destination 106. The asynchronous message delivery system 108 may, in some examples, be provided and/or operated by a cloud services provider or other service provider. For instance, the asynchronous message delivery system 108 may be an Amazon Web Services (AWS) Simple Queue Service (SQS), or another system or service that may be configured to asynchronously deliver messages 102.

The asynchronous message delivery system 108 may have one or more message delivery queues 116. The message delivery queues 116 may include a main queue. A message 102 sent by the message source 104 may be added to the main queue, for instance at the end of the main queue. As other messages in the main queue are delivered, the message 102 may move towards the front of the main queue.

The asynchronous message delivery system 108 may attempt to deliver the message 102 in the main queue to the message destination 106. In some examples, the asynchronous message delivery system 108 may be configured to use push-based procedures to attempt to deliver the message 102 from the main queue to the message destination 106. For instance, when the message 102 reaches the front of the main queue, the asynchronous message delivery system 108 may attempt to proactively deliver the message 102 to the message destination 106, without responding to a request from the message destination 106. In other examples, the asynchronous message delivery system 108 may be configured to use pull-based procedures to attempt to deliver the message 102 to the message destination 106. For instance, if and/or when the message destination 106 submits a request to the asynchronous message delivery system 108 for any new messages that may be in the main queue, the asynchronous message delivery system 108 may attempt to deliver the message 102 to the message destination 106.

In some examples, the asynchronous message delivery system 108 may have one or more other message delivery queues 116, in addition to a main queue. For example, the asynchronous message delivery system 108 may also have a retry queue and/or an undeliverable queue.

A retry queue in the asynchronous message delivery system 108 may store messages 102 that were not successfully delivered to the message destination 106 via the main queue. As an example, the asynchronous message delivery system 108 may move messages 102 from the main queue to the retry queue if the asynchronous message delivery system 108 uses pull-based procedures, but the asynchronous message delivery system 108 does not receive requests for the messages 102 in the main queue from the message destination 106 for at least a threshold period of time. As another example, and as discussed further below, one or more types of errors or other issues may prevent the asynchronous message delivery system 108 from delivering messages 102 to the message destination 106 in response to pull requests from the message destination 106 and/or if the asynchronous message delivery system 108 attempts to push messages 102 to the message destination 106.

The asynchronous message delivery system 108 may be configured to automatically re-attempt to deliver messages in the retry queue to the message destination 106 up to a defined maximum number of times. The retry queue in the asynchronous message delivery system 108 may be configured to use an exponential backoff strategy or other delay strategy to determine delay durations between successive redelivery attempts for a particular message. For example, if the retry queue uses an exponential backoff strategy, the asynchronous message delivery system 108 may wait progressively longer times between successive attempts to deliver a message to the message destination 106.

An undeliverable queue in the asynchronous message delivery system 108 may be a "dead-letter" queue or other queue that is configured to store messages 102 that could not be successfully delivered to the message destination 106 via the main queue, the retry queue, and/or other elements of the asynchronous message delivery system 108. As an example, if the retry queue of the asynchronous message delivery system 108 is configured to re-attempt delivery of the message 102 to the message destination 106 up to five times, but delivery of the message 102 to the message destination 106 has not succeeded after five attempts via the retry queue, the message 102 may be added to the undeliverable queue of the asynchronous message delivery system 108. As another example, if the asynchronous message delivery system 108 does not have a retry queue and delivery of the message 102 has failed one or more times via the main queue, the message 102 may be added to the undeliverable queue of the asynchronous message delivery system 108.

Various types of errors and/or other issues may prevent the asynchronous message delivery system 108 from successfully delivering a message 102 to the message destination 106. As an example, delivery of a message 102 may fail if the message destination 106 is offline, is misconfigured, or is experiencing an error at a time when the asynchronous message delivery system 108 attempts to deliver the message 102 to the message destination 106 via push procedures or via pull procedures in response to an earlier pull request from the message destination 106. As another example, delivery of the message 102 may fail if a network issue prevents transmission of the message 102 from the asynchronous message delivery system 108 to the message destination 106 via push procedures or via pull procedures in response to an earlier pull request from the message destination 106, even if the message destination 106 itself is online and operating normally.

As yet another example, delivery of the message 102 may fail if the message 102 itself is corrupted, is incorrectly formatted, and/or has another error. For instance, the message destination 106 may be configured to accept delivery of messages 102 that are formatted according to a particular format, but to reject delivery of messages 102 that are not formatted according to that particular format. Accordingly, if the message source 104 is not configured to format the message 102 according to the particular format that the message destination 106 accepts, or an error causes the message 102 to omit data required by that particular format, the message destination 106 may not accept the message 102 when the asynchronous message delivery system 108 attempts to the deliver the message 102 via push procedures or via pull procedures, such that the delivery attempt fails. In some situations, such errors may occur if the message destination 106 has been updated to use a new message format, but the message source 104 has not yet been updated to generate messages 102 based on that new message format. Similarly, if the message 102 is properly formatted by the message source 104, an error or misconfiguration at the message destination 106 may cause the message destination 106 to reject the message 102 and a delivery attempt by the asynchronous message delivery system 108 may fail.

As shown in FIG. 1, when the asynchronous message delivery system 108 is unable to deliver a message 102 to the message destination 106, the separate message error recovery system 110 may add that message 102 to the retry database 112. For example, the message error recovery system 110 may create an entry in the retry database 112 that stores the message 102 and/or information indicated by the message 102. The retry database 112 may be a table, a database, or other type of data repository that stores information about messages 102 that could not be delivered via the asynchronous message delivery system 108.

Figure 4:
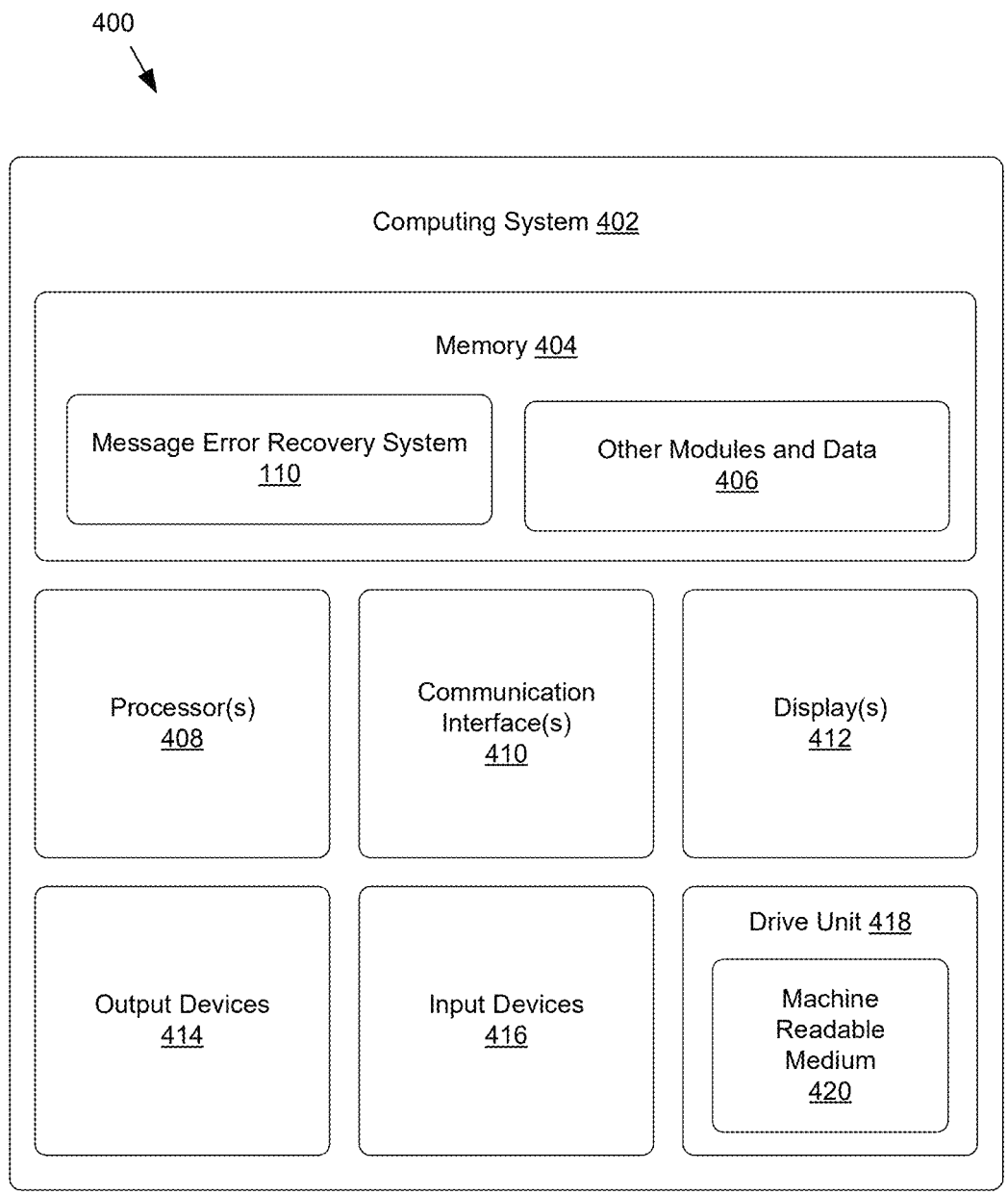
FIG. 4 shows an example system architecture for a computing system that may execute one or more elements described herein.

The message error recovery system 110 may be a computer-implemented system, service, or platform that executes separately from the asynchronous message delivery system 108. For example, the message error recovery system 110 may be outside of, and run independently from, the asynchronous message delivery system 108. The message error recovery system 110 may also maintain the retry database 112 separately and independently from the one or more message delivery queues 116 of the asynchronous message delivery system 108. A computing system that may execute the message error recovery system 110 is shown in FIG. 4, and is described further below with respect to that figure.

In some examples, the message error recovery system 110 may be configured to monitor the asynchronous message delivery system 108 for indications that the asynchronous message delivery system 108 was not able to successfully deliver messages 102, and that the asynchronous message delivery system 108 is not scheduled to make any further attempts to deliver such messages 102. If the message error recovery system 110 identifies messages 102 that the asynchronous message delivery system 108 has not been able to successfully deliver and is no longer attempting to deliver, the message error recovery system 110 may add such messages 102 to the retry database 112 of the message error recovery system 110.

As an example, if the asynchronous message delivery system 108 includes a dead-letter queue, the message error recovery system 110 may be configured to monitor the dead-letter queue of the asynchronous message delivery system 108 to identify messages 102 that the asynchronous message delivery system 108 has determined to be undeliverable. Accordingly, when the asynchronous message delivery system 108 determines that the message 102 is unable to be delivered to the message destination 106 and places the message 102 into a dead-letter queue, such that no further redelivery attempts would be performed by the asynchronous message delivery system 108, the message error recovery system 110 May identify the message 102 added to the added to the dead-letter queue of the asynchronous message delivery system 108 and may also add the message 102 to the retry database 112 of the message error recovery system 110.

As another example, if the asynchronous message delivery system 108 does not have a dead-letter queue or other undeliverable queue, and the asynchronous message delivery system 108 determines that the asynchronous message delivery system 108 has been unable to deliver the message 102 and is not configured to make any further attempts to deliver the message 102, the asynchronous message delivery system 108 may be configured to send the message 102 to the message error recovery system 110. Accordingly, the message error recovery system 110 may add the message 102 received from the asynchronous message delivery system 108 to the retry database 112 of the message error recovery system 110.

Although FIG. 1 shows the message error recovery system 110 being associated with one asynchronous message delivery system 108, in some examples the message error recovery system 110 may be associated with multiple asynchronous message delivery systems 108. For example, different asynchronous message delivery systems 108 may be set up to asynchronously deliver messages 102 from the same message source 104 to different message destinations 106, from different message sources 104 to the same message destination 106, and/or from different message sources 104 to different message destinations 106. Accordingly, although different asynchronous message delivery systems 108 may attempt to deliver messages 102 between different pairs of message sources 104 and message destinations 106, a single message error recovery system 110 may be configured to add undeliverable message 102 from any or all of the different asynchronous message delivery systems 108 to the same retry database 112.

As described herein, the message error recovery system 110 may send a retry message 114, corresponding to a message 102, to the asynchronous message delivery system 108 that had been unable to the deliver that message 102 to a message destination 106. The asynchronous message delivery system 108 may be able to deliver the retry message 114 to the message destination 106, even if the asynchronous message delivery system 108 had not been able to deliver the original message 102 to the message destination 106. In examples in which the message error recovery system 110 may add messages 102 from multiple different asynchronous message delivery systems 108 to the retry database 112, the message error recovery system 110 may be configured to automatically send retry messages 114, corresponding to messages 102, back to the same asynchronous message delivery systems 108 that had previously attempted to deliver those messages 102.

Figure 2:
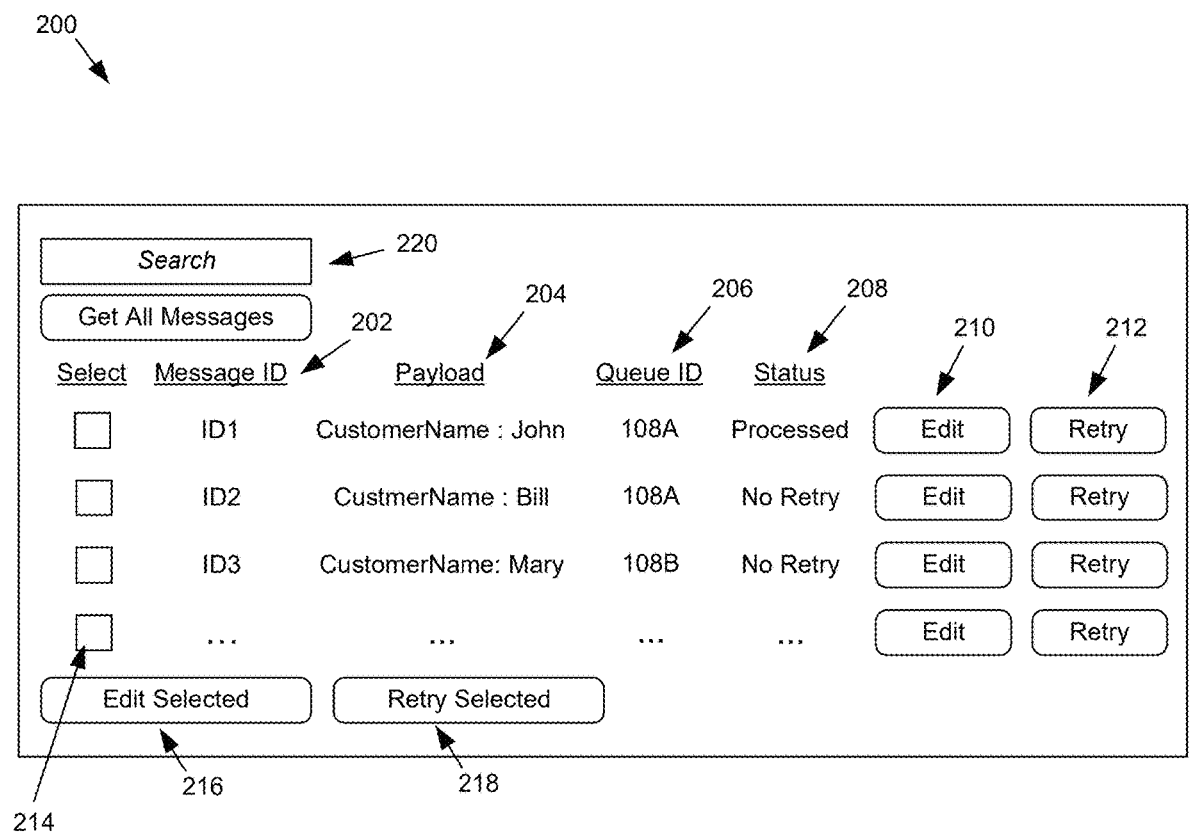
FIG. 2 shows an example of the user interface of a message error recovery system.

The message error recovery system 110 may have a user interface 118 that allows users to view and/or edit messages 102 that have been added to the retry database 112. An example of the user interface 118 is shown in FIG. 2, and is discussed further below with respect to that figure. Users may use computers, smartphones, and/or other computing devices to access and interact with the user interface 118, for instance via an Internet connection or other network connection with the message error recovery system 110.

The user interface 118 may display information about messages 102 in the retry database 112, such as information indicated in headers and/or payloads of the messages 102. For example, for a particular message 102, the user interface 118 may display information about the message destination 106 to which the particular message 102 is addressed, the message source 104 that sent the particular message 102, an identity of the asynchronous message delivery system 108 that was unable to deliver the particular message 102 to the message destination 106, information conveyed in the payload of the particular message 102, and/or other information about the particular message 102.

The user interface 118 may also have options that allow users to edit messages 102 in the retry database 112. For instance, if a user determines based on information presented via the user interface 118 that an error in a header or payload of a particular message 102 may have caused the particular message 102 to be undeliverable by the asynchronous message delivery system 108, the user may edit the header or payload via the user interface 118 to resolve the error.

As an example, if the message destination 106 is configured to only accept messages 102 with payloads that include a particular required attribute-value pair, the asynchronous message delivery system 108 may have been unable to successfully deliver a message 102 to the message destination 106 if the required attribute-value pair was omitted from, or was mis-formatted within, the payload of that message 102. However, after the message 102 is added to the retry database 112 of the message error recovery system 110, a user may see via the user interface 118 that the attribute-value pair required by the message destination 106 was omitted from, or was mis-formatted in, the payload of the message 102. The user may use the user interface 118 to edit the message 102 in the retry database 112, such that the payload of the edited message 102 includes a properly-formatted instance of the attribute-value pair required by the message destination 106.

The user interface 118 may also have options that allow users to instruct the message error recovery system 110 to send retry messages 114, corresponding to messages 102 in the retry database 112, to the asynchronous message delivery systems 108 that had previously been unable to deliver those messages 102. The retry messages 114 may be copies of the messages 102 in the retry database 112, such as original copies of previously-undeliverable messages 102, or copies of previously-undeliverable messages 102 that have been edited via the user interface 118 to resolve errors.

The message error recovery system 110 may send a retry message 114, corresponding to a previously-undeliverable message 102, to the asynchronous message delivery system 108 that had been unable to deliver the message 102 to a message destination 106. The asynchronous message delivery system 108 may attempt to deliver the retry message 114 to the message destination 106 via one or more message delivery queues 116, for instance via a main queue and/or a retry queue based on push procedures, pull procedures, or other delivery procedures. Users may accordingly use the user interface 118 to cause the message error recovery system 110 to output retry messages 114 that may be likely to be deliverable via the asynchronous message delivery system 108.

As a first example, the asynchronous message delivery system 108 may have been unable to deliver a message 102 to the message destination 106 at a first time at which the message destination 106 was offline or was unreachable due to a network issue. However, at a second time when the message destination 106 is online and reachable, a user of the user interface 118 may instruct the message error recovery system 110 to retry delivery of the message 102 by sending a copy of the message 102, as a retry message 114, to the asynchronous message delivery system 108. Because the message destination 106 is no longer offline or unreachable, the asynchronous message delivery system 108 may be able to successfully deliver the retry message 114 to the message destination 106. The message destination 106 may accordingly receive an instance of the original message 102, via the corresponding retry message 114 sent by the message error recovery system 110, even though the asynchronous message delivery system 108 had not previously been able to deliver the original message 102 and may have been configured to not make any more attempts to deliver the original message 102.

As a second example, the asynchronous message delivery system 108 may have been unable to deliver a message 102 to the message destination 106 at a first time due to an error in the content and/or formatting of the message 102. A user may use the user interface 118 to edit the copy of the message 102, stored in the retry database 112, to fix the error in the content and/or formatting of the message 102. At a second time, after editing of the message 102 to fix the error, a user of the user interface 118 may instruct the message error recovery system 110 to retry delivery of the message 102 by sending a copy of the edited message 102, as a retry message 114, to the asynchronous message delivery system 108. Because the retry message 114 may be a version of the original message 102 that has been edited to fix the content and/or formatting error that had prevented delivery of the original message 102, the asynchronous message delivery system 108 may be able to successfully deliver the retry message 114 to the message destination 106. The message destination 106 may accordingly receive an edited instance of the original message 102, via the corresponding retry message 114 sent by the message error recovery system 110, even though the asynchronous message delivery system 108 had previously not been able to deliver the original message 102.

In some examples, the user interface 118 may allow a user to filter or search for messages 102. For instance, the user interface 118 may allow a user to search for messages 102 in the retry database 112 that were received from a particular asynchronous message delivery system 108, that were sent by a particular message source 104, that were addressed to a particular message destination 106, that were sent or received during a particular timeframe, and/or that have attributes satisfying other user-defined criteria.

The user interface 118 may also allow a user to edit multiple messages 102 simultaneously, and/or to instruct the message error recovery system 110 to output multiple retry message 114 that correspond to multiple messages 102. Accordingly, the user interface 118 may allow users to cause the message error recovery system 110 to attempt delivery of a batch of messages 102, via corresponding retry messages 114.

As a first example, if the message destination 106 was offline due to an error during a one-hour period, the asynchronous message delivery system 108 may have been unable to deliver numerous messages 102 addressed to the messages destination 106 during that one-hour period, even if the asynchronous message delivery system 108 has a retry queue that uses an exponential backoff strategy or has another native retry system. For instance, the asynchronous message delivery system 108 may be configured to make up to five attempts to deliver each individual message 102 over periods of up to thirty minutes. However, because the message destination 106 is offline for an hour in this example, the asynchronous message delivery system 108 may perform the maximum amount of five delivery attempts over thirty-minute periods for numerous messages 102 during that hour. The asynchronous message delivery system 108 may accordingly move numerous messages 102 into a dead-letter queue before the message destination 106 is back online. As discussed above, the asynchronous message delivery system 108 may not be configured to make any further delivery attempts for messages 102 that have been added to the dead-letter queue.

However, because those messages 102 may also be added to the retry database 112 of the message error recovery system 110 in this example, a user may select all or a subset of those messages 102 in the user interface 118 after the message destination 106 is back online. The user may also provide user input via the user interface 118 that causes the message error recovery system 110 to send a group of retry messages 114, corresponding to the group of user-selected messages 102, to the asynchronous message delivery system 108. Because the message destination 106 is back online, the asynchronous message delivery system 108 may be likely to successfully deliver the retry messages 114 to the message destination 106.

As a second example, if the message source 104 was misconfigured and sent numerous incorrectly-formatted messages 102 that during a particular period of time, the message destination 106 may have rejected all of those incorrectly-formatted messages 102. The asynchronous message delivery system 108 may accordingly move the incorrectly-formatted messages 102, rejected by the message destination 106, into a dead-letter queue, and may not be configured to make any further delivery attempts for those messages 102.

However, because those messages 102 may also be added to the retry database 112 of the message error recovery system 110 in this example, a user may select all or a subset of those messages 102 in the user interface 118. The user may use the user interface 118 to edit the group of selected messages 102 to correct the error in the formatting of the messages 102 caused by the misconfiguration of the message source 104. For instance, the user may define a bulk edit via the user interface 118, such that the message error recovery system 110 may apply the bulk edit to all of the selected messages 102. The user may also provide user input via the user interface 118 that causes the message error recovery system 110 to send a group of retry messages 114, corresponding to the group of now-edited messages 102, to the asynchronous message delivery system 108. Because the retry messages 114 reflect edits that corrected the formatting error that had previously caused the message destination 106 to reject the original messages 102, the asynchronous message delivery system 108 may be likely to successfully deliver the retry messages 114 to the message destination 106.

The retry database 112 may track status information associated with corresponding message 102, and the user interface 118 may use such status information display the current status of individual messages 102. For example, if a message 102 has not yet been processed via the message error recovery system 110, such that the message error recovery system 110 has not yet sent a retry message 114 corresponding to the message 102, the retry database 112 and/or the user interface 118 may indicate that the message 102 has an "unprocessed" or "no retry" status. However, if the message error recovery system 110 has already sent a retry message 114 corresponding to a message 102, the retry database 112 and/or the user interface 118 may indicate that the message 102 has a "processed" status. The message error recovery system 110 may be configured to update the status of the message 102 to "processed" if and when the asynchronous message delivery system 108 acknowledges receipt of the corresponding retry message 114 via a "200 OK" message or other type of confirmation. Accordingly, messages 102 that are newly added to the retry database 112 from one or more asynchronous message delivery systems 108 may initially have an "unprocessed" or "no retry" status in the message error recovery system 110. The message error recovery system 110 may then update the status of those messages 102 to a "processed" status when the message error recovery system 110 sends corresponding retry messages 114 back to the corresponding asynchronous message delivery systems 108.

In some examples, the user interface 118 may also provide options that allow users to delete messages 102 from the retry database 112. For example, if a user of the user interface 118 determines that one or more messages 102 added to the retry database 112 should not be delivered to one or more corresponding message destinations 106, the user may provide input to the user interface 118 that causes those messages 102 to be deleted from the retry database 112, such that the message error recovery system 110 would not send retry messages 114 that correspond to the deleted messages 102.

In some examples, the message error recovery system 110 may be configured to maintain copies of messages 102 in the retry database 112 for at least a predetermined period of time after the message error recovery system 110 has sent retry messages 114 that correspond to those messages 102. For example, if the message error recovery system 110 sends a retry message 114 corresponding to a particular message 102, the message error recovery system 110 maintain an entry for that particular message 102 in the retry database 112 for thirty days, or any other shorter or longer predetermined period of time. Although the asynchronous message delivery system 108 may be likely to be able to successfully deliver the retry message 114 corresponding the particular message 102 within a relatively short period of time, such as within a few minutes or an hour, maintaining a record of the particular message 102 in the retry database 112 for thirty days or another longer predetermined period of time may allow audits to be performed based on the information maintained in the retry database 112. For example, audits may be performed based on information retained in the retry database 112 for at least the predetermined period of time to determine how many messages 102 and/or corresponding retry messages 114 have been processed by the message error recovery system 110 during certain periods of time, to determine which message sources 104, messages destinations 106, and/or asynchronous message delivery systems 108 were associated with messages 102 and/or retry messages 114 processed by the message error recovery system 110 during certain periods of time, and/or to determine other metrics or information about messages 102 and/or retry messages 114 processed by the message error recovery system 110.

In some examples, when a message 102 is added to the retry database 112 of the message error recovery system 110, an alert generator 120 of the message error recovery system 110 may generate and/or send a corresponding alert to one or more entities. For example, the alert generator 120 may send an email, text message, notification, or other alert to a user, such as a programmer or product team, associated with the message source 104 and/or the message destination 106 corresponding to a message 102 that has been added to the retry database 112. A user who receives such an alert from the alert generator 120 may choose to log into the message error recovery system 110 to view information about the message 102 via the user interface 118. Based on that information, the user may provide input via the user interface 118 that causes the message error recovery system 110 to edit the message 102 and/or to send a corresponding retry message 114. The user may also, or alternately, use the information presented via the user interface 118 to identify, investigate, and/or correct an error that may have prevented the asynchronous message delivery system 108 from delivering the message 102.

For instance, as discussed above, if the user determines that an error in the formatting of the message 102 had prevented delivery of the message 102, the user may use the user interface 118 to edit the message 102 and to cause the message error recovery system 110 to send the edited version of the message 102 back to the asynchronous message delivery system 108 as a retry message 114. However, the user may also, or alternately, investigate and/or correct any issues with the message source 104 that may have led to the error in the message 102.

As an example, if the alert generator 120 alerts the user that a first message 102 from the message source 104 was undeliverable to the message destination 106 and has been added to the retry database 112, the user may view the header and/or payload of the first message 102 via the user interface 118. The user may, based on information displayed via the user interface 118, identify a formatting error in the first message 102 that likely caused the first message to be undeliverable to the message destination 106. The user may also determine that a programming bug at the message source 104 likely caused the first message 102 to be generated with the formatting error. Accordingly, instead of or in addition to editing the first message 102 via the user interface 118, the user may attempt to fix the programming bug at the message source 104. By fixing the programming bug at the message source 104 in response to an alert provided by the alert generator 120, the message source 104 may be prevented from generating and sending future messages 102 that have the formatting error that would cause those messages 102 to be undeliverable.

Similarly, if the user instead determines in response to an alert generated by the alert generator 120 that another type of error had prevented delivery of the message 102, such as if the message destination 106 was offline or unreachable, the user may investigate whether that error has been resolved. If the user determines that the error has been resolved, the user may use the user interface 118 to cause the message error recovery system 110 to send the message 102 back to the asynchronous message delivery system 108 as a retry message 114. If the user determines that the error has not been resolved, the user may investigate and/or correct the error. For instance, if the message destination 106 had been offline, the user May take actions that lead to the message destination 106 coming back online. After the error has been resolved, the user may use the user interface 118 to cause the message error recovery system 110 to send the message 102 back to the asynchronous message delivery system 108 as a retry message 114.

In some examples, the message error recovery system 110 may have a rule engine 122 that applies a set of defined rules. The rule engine 122 may use such rules to automatically perform one or more types of operations, instead of or in addition to operations performed based on, and/or in response to, user input received via the user interface 118.

As an example, the rule engine 122 may apply validation and/or correction rules to messages 102 added to the retry database 112. Such validation and/or correction rules may be configured to automatically identify one or more types of errors in messages 102 added to the retry database 112, to automatically edit the messages 102 to correct those types of errors, and to automatically cause the message error recovery system 110 to send the automatically-edited messages 102 as retry messages 114. For instance, the validation and/or correction rules may include JSON rules that are configured to identify a set of defined types of JSON syntax or formatting errors. Accordingly, if a message 102 added to the retry database 112 is missing a quotation mark, closing bracket, or other character that may be required by JSON formatting standards, rules applied by the rule engine 122 may automatically identify that error, may automatically edit the message 102 to add the missing character, and/or may cause the message error recovery system 110 to automatically send the edited version of the message 102 as a retry message 114. In other examples, such rules applied by the rule engine 122 may cause indications of such automatically-detected formatting and/or syntax errors to be displayed in the user interface 118 in association with corresponding messages 102, and/or to be included in corresponding alerts generated and sent by the alert generator 120.

As another example, the rule engine 122 may apply error correction rules to messages 102 added to the retry database 112 based on error information provided by the message destination 106 and/or the asynchronous message delivery system 108. For example, if the asynchronous message delivery system 108 was unable to reach the message destination 106 during a period of time such that the asynchronous message delivery system 108 could not deliver a message 102 to the message destination 106, the asynchronous message delivery system 108 may provide error and/or diagnostic information to the message error recovery system 110 in addition to the undeliverable message 102. Such error and/or diagnostic information may indicate that the message destination 106 had been determined to be unreachable over a network at one or more identified times. The rule engine 122 may apply rules to the error and/or diagnostic information that automatically cause the message error recovery system 110 to send a retry message 114 corresponding to the undeliverable message 102 after a predetermined period of time has elapsed following the last delivery attempt performed by the asynchronous message delivery system 108, after a network ping by the message error recovery system 110 or another element has confirmed that the message destination 106 has again become reachable, and/or in response to any other data indicating that the retry message 114 is likely to be able to be delivered by the asynchronous message delivery system 108. In other examples, the message error recovery system 110 may also or alternately display such error and/or diagnostic information to a user via the user interface 118, such that the user may review the error and/or diagnostic information and determine how to respond to the error.

Similarly, if the message destination 106 rejected a message 102 due to a particular error, the message destination 106 may have provided corresponding error and/or diagnostic information to the asynchronous message delivery system 108. The asynchronous message delivery system 108 may pass the error and/or diagnostic information from the message destination 106 to the message error recovery system 110. Accordingly, as discussed above, the rule engine 122 may apply one or more rules based on the error and/or diagnostic information from the message destination 106, and/or the user interface 118 may display the error and/or diagnostic information from the message destination 106 so that a user may determine how to respond to the error identified by the message destination 106.

In some examples, rules applied by the rule engine 122 and/or the alert generator 120 may indicate which entities, such as which users or product teams, should be alerted in response to different types of errors and/or different types of messages 102 added to the message 102. For example, rules applied by the rule engine 122 may indicate that, for a particular type of message 102 that is generated by a particular message source 104, one or more members of a particular product team associated with that message source 104 should be notified by the alert generator 120 any time an instance of that type of message 102 is added to the retry database 112.

Overall, when an asynchronous message delivery system 108 is unable to deliver a message 102 to a message destination 106, a separate message error recovery system 110 may add the message 102 to a retry database 112. If the message 102 included an error that prevented the asynchronous message delivery system 108 from delivering the message 102, the message error recovery system 110 may correct the error by editing the message 102 in the retry database 112 based on user input received via a user interface 118 and/or based on rules automatically applied by the rule engine 122. The message error recovery system 110 may send a retry message 114 corresponding to the message 102 back to the asynchronous message delivery system 108, for instance after the message 102 has been edited to correct an error or after another type of error that had prevented delivery of the message 102 has been resolved. Accordingly, the asynchronous message delivery system 108 may be likely to be able to successfully deliver the retry message 114 sent by the message error recovery system 110, even though the asynchronous message delivery system 108 had not been able to deliver the original message 102.

The message error recovery system 110 may accordingly increase the chances that content conveyed in a message 102 sent by a message source 104 is ultimately received by the message destination 106. For example, if one of the one or more message delivery queues 116 of the asynchronous message delivery system 108 is a dead-letter queue, the asynchronous message delivery system 108 may be configured to place undeliverable messages 102 into the dead-letter queue and to make no further attempts to deliver messages 102 added to the dead-letter queue. However, because such messages 102 added to a dead-letter queue may be added to the retry database 112 of the message error recovery system 110, and may later be resent in original or edited form as retry messages 114 by the message error recovery system 110 after errors have been resolved, the content of the messages 102 added to the dead-letter queue may later be successfully delivered via the retry messages 114 even though the asynchronous message delivery system 108 would not otherwise have continued to deliver the messages 102 added to the dead-letter queue.

Some dead-letter queues of asynchronous message delivery systems 108 allow users to examine the contents of the dead-letter queues, for instance to identify undeliverable messages 102 that have been added to a dead-letter queue. However, many dead-letter queues are configured to remove messages 102 from the dead-letter queues when those messages 102 are accessed by users. Accordingly, automatic removal of accessed messages 102 from the dead-letter queues of asynchronous message delivery systems 108 may remove records of such undeliverable messages 102, thereby leading to risks that the undeliverable messages 102 may be forgotten about and never re-attempted. However, as described herein, records of messages 102 added to a dead-letter queue of an asynchronous message delivery system 108 may be added to the retry database 112 of a separate message error recovery system 110, such that records of those messages 102 may be maintained in the retry database 112 and delivery of the messages 102 may be reattempted via retry messages 114 sent by the message error recovery system 110.

Other dead-letter queues of asynchronous message delivery systems 108 may allow undeliverable messages 102 added to the dead-letter queues to be sent back to message sources 104 so that the message sources 104 can re-send the messages 102, and/or may allow undeliverable messages 102 to be returned from the dead-letter queues to main queues of the asynchronous message delivery systems 108 for further delivery attempts. However, these types of dead-letter queues may not allow such messages 102 to be edited prior to further delivery attempts by the asynchronous message delivery systems 108. Accordingly, errors in the messages 102 that prevented the asynchronous message delivery system 108 from initially delivering the messages may still be present and thereby prevent the asynchronous message delivery system 108 from successfully delivering the messages moved from the dead-letter queue back to the main queue. However, as described herein, messages 102 added to the retry database 112 of the message error recovery system 110, separate from the dead-letter queue of the asynchronous message delivery system 108, may be edited via the user interface 118 and/or the rule engine 122. Such edits via the message error recovery system 110 may increase the chances of the asynchronous message delivery system 108 being able to successfully deliver retry messages 114 that correspond to the edited messages 102. Examples of processing and/or editing messages 102 via the message error recovery system 110 are discussed further below with respect to FIG. 2 and FIG. 3.

FIG. 2 shows an example 200 of the user interface 118 of the message error recovery system 110. As discussed above, messages 102 that the asynchronous message delivery system 108 are unable to deliver due to one or more errors may be added to the retry database 112 of the message error recovery system 110. The user interface 118 may display information about the messages 102 that have been added to the retry database 112. The user interface 118 may also provide options for users to search for messages 102 to be displayed in the user interface 118, options for users to edit one or more messages 102 via the user interface 118, options that cause the message error recovery system 110 to send retry messages 114 corresponding to original and/or edited messages 102, and/or other options.

As shown in FIG. 2, the user interface 118 may display information about one or more messages 102, based on information stored in the retry database 112. For example, the user interface 118 may display message identifiers 202 of the messages 102, payload information 204 about the payloads of the messages 102, queue identifiers 206 of the asynchronous message delivery systems 108 that previously processed the messages 102, status indicators 208 of the messages 102, and/or other information.

The message identifiers 202 may identify the corresponding messages 102. For example, the message identifiers 202 may be numbers, hexadecimal values, strings of alphanumeric characters, and/or other types of data. In some examples, the message identifiers 202 may be identifiers of the messages 102 within the retry database 112, such as identifiers of rows or records in the retry database 112 that store information about the messages 102. In other examples, the message identifiers 202 may be identifiers of the messages 102 assigned by the message sources 104 that sent the messages 102, assigned by the asynchronous message delivery systems 108 that processed the messages, or assigned by any other element.

The payload information 204 may express contents of the payloads of the messages 102. For example, the payload information may indicate JSON attribute-value pairs and/or other types of content within the payloads of the messages 102. In some example, the user interface 118 may have options to expand the payload information 204 of one or more messages 102 selected via the user interface 118, for instance to display full contents of the payloads of selected messages 102 in the user interface 118.

The queue identifiers 206 may be identifiers of the asynchronous message delivery systems 108 that previously processed the messages 102 and found the messages to be undeliverable. As discussed above, in some examples the message error recovery system 110 may be linked to multiple asynchronous message delivery systems 108. Accordingly, the queue identifiers 206 may identify which of the multiple asynchronous message delivery systems 108 provided each of the messages 102 displayed in the user interface 118, such as a first asynchronous message delivery system 108A, a second asynchronous message delivery system 108B, and/or other asynchronous message delivery systems 108.

The status indicators 208 may be values indicating whether corresponding messages 102 have yet to be processed by sending corresponding retry messages 114 via the message error recovery system 110, or whether such messages 102 have already been processed via the sending of corresponding retry messages 114 via the message error recovery system 110. For example, if the message error recovery system 110 has already sent a retry message 114 that corresponds to a particular message 102, the user interface 118 may display a status indicator 208 of "Processed" in association with that particular message 102. However, if the message error recovery system 110 has not yet sent a retry message 114 that corresponds to a particular message 102, the user interface 118 may display a status indicator 208 of "No Retry" in association with that particular message 102.

The user interface 118 may display other types of information associated with messages 102 instead of, or in addition to, the types of information shown in FIG. 2. As an example, the user interface 118 may display header information associated with messages 102, such as identifiers of message sources 104 and/or message destinations 106 associated with messages 102 and/or other information conveyed in headers of the messages 102. As another example, the user interface 118 may display one or more timestamps indicating when the messages 102 were sent, when the messages 102 were added to the retry database 112, when the messages 102 were last edited in the retry database 112, and/or when other actions associated with the message 102 occurred. As yet another example, the user interface 118 may display identifier of the entities that last interacted with the messages 102, such as identifiers of the asynchronous message delivery systems 108 that provided the messages 102 or identifiers of users who last edited the messages 102 via the user interface 118.

As shown in FIG. 2, the user interface 118 may provide edit options 210 in association with messages 102. If a user selects an edit option 210 in association with a particular message 102, the user interface 118 may display user-editable fields associated with the payload information 204 and/or otherwise present features by which the user may provide input to edit the header and/or payload of the message 102. Any edits to a message 102 made by a user via the edit option 210 may be used as edit instructions that are applied to edit the copy of the message 102 stored in the retry database 112, and the user interface 118 may update to display information about the edited state of the message 102.

The user interface 118 may also provide retry options 212 in association with messages 102. If a user selects a retry option 212 in association with a particular message, the message error recovery system 110 may generate and send a retry message 114 based on the copy of the message 102 stored in the retry database 112. The retry message 114 may be a copy of the original message 102 if a user has not used the edit option 210 to edit the message 102, or may be an edited copy of the message 102 if a user has edited the message 102 via the edit option 210.

When a user selects a retry option 212 in association with a message 102, the message error recovery system 110 may send the corresponding retry message 114 to the asynchronous message delivery system 108 that identified by the queue identifier 206 associated with the message 102. For example, if a user selects a retry option 212 in association with a particular message 102 received from a second asynchronous message delivery system 108B, the message error recovery system 110 may automatically send the corresponding retry message 114 back to the second asynchronous message delivery system 108B based on the queue identifier 206 associated with the particular message 102.

In some examples the edit option 210 may be configured to only allow a user to edit payload information 204 and/or certain types of header information associated with a message 102, but may not permit the user to edit the queue identifier 206 associated with the message 102. Accordingly, because the queue identifiers 206 may not be user-editable in these examples, the message error recovery system 110 may automatically send the retry message 114 corresponding to the message 102 back to the particular asynchronous message delivery system 108 from which the message 102 was received, and thereby avoid returning the retry message 114 to the wrong asynchronous message delivery system 108. However, in some examples the user interface 118 may be configured to allow users to edit queue identifiers 206 associated with messages 102, for instance if a new or different asynchronous message delivery system 108 has been set up to resolve an error that had presented another asynchronous message delivery system 108 from delivering messages 102.

The user interface 118 may have select options 214 that allow users to select one or more messages 102, as well as a bulk edit option 216 and/or a bulk retry option 218 that apply to the one or more messages 102 selected via the select options 214. For example, a user may use select options 214, for example by clicking on checkboxes or by providing other types of input, to select a group of messages 102 displayed in the user interface 118.

A user may select the bulk edit option 216 to apply the same edit to all of a selected group of messages 102. For example, the bulk edit option 216 may allow the user to provide a value for a particular attribute-value pair in the payloads of all of the selected messages 102, and the message error recovery system 110 may update that attribute-value pair in the payloads of all of the selected messages 102 to indicate the user-provided value. Accordingly, while a user may edit messages 102 individually via the edit options 210 associated with individual messages 102, the user may choose to instead edit multiple messages 102 simultaneously via the bulk edit option 216. For instance, if a group of messages 102 all have the same error, a user may correct that error in all of the messages 102 simultaneously via the bulk edit option 216.

A user may select the bulk retry option 218 to cause the message error recovery system 110 to send retry messages 114 that correspond to all of a selected group of messages 102. As an example, if an asynchronous message delivery system 108 was unable to deliver a set of messages 102 to a message destination 106 during a particular period of time because the message destination 106 was offline or could not be reached via a network, all of those messages 102 may have been added to the retry database 112 and may have corresponding information displayed via the user interface 118. If a user determines that the error that had prevented the asynchronous message delivery system 108 from delivering the messages 102 initially has been resolved, the user may select the bulk retry option 218 to cause the message error recovery system 110 to send retry messages 114, corresponding to the messages 102, back to the asynchronous message delivery system 108. As another example, if a user has edited multiple messages 102 to correct errors in those messages 102 via the edit option 210 and/or the select options 214, the user may select the edited messages 102 via the select options 214, and may use the bulk retry option 218 to cause the message error recovery system 110 to send retry messages 114 that correspond to the edited messages 102.

In some examples, the user interface 118 may also or alternately have search options 220 that allow users to filter or search for particular types of messages 102 to be displayed in the user interface 118. In some examples, the search options 220 may also allow the user to indicate that the user interface 118 should display all of the messages 102 currently stored in the retry database 112.

As discussed above, the status indicators 208 shown in the user interface 118 in association with messages 102 may indicate whether or not the message error recovery system 110 has processed the messages 102 by sending corresponding retry messages 114. The status indicators 208 may initially indicate a "No Retry" status when messages 102 are initially added to the retry database 112 and/or when no corresponding retry messages 114 have been sent. However, when a user selects retry options 212 and/or the bulk retry option 218 to cause the message error recovery system 110 to send retry message 114 corresponding to messages 102, the status indicators 208 may be changed to a "Processed Status" in the retry database 112 and/or the user interface 118.

As a non-limiting example, the example 200 of the user interface 118 shown in FIG. 2 displays information about three messages 102. A first message 102 having a message identifier 202 of "ID1" and a second message 102 having a message identifier 202 of "ID2" may have had the same error in payload information 204, and the error may have caused a first asynchronous message delivery system 108A to find both messages 102 to be undeliverable. For instance, a misconfiguration with a message source 104 of the two messages 102 may have caused an attribute-value pair of the messages 102 to have an incorrectly-spelled "Custmer-Name" attribute instead of correctly-spelled "Customer-Name" attribute, and a message destination 106 may have rejected delivery of the messages from the first asynchronous message delivery system 108A due to the error in the attribute name.

In this example, a user may have previously used the edit option 210 associated with the first message 102 having the message identifier 202 of "ID1" to correct the spelling of the attribute in the payload information 204. The user may also have used the retry option 212 to cause the message error recovery system 110 to send the edited version of the first message 102 back to the first asynchronous message delivery system 108A as a retry message 114. Accordingly, because a retry message 114 associated with the first message has already been sent, the status indicator 208 of the first message 102 displayed in the user interface 118 may be "Processed."

However, in this example, a user may not yet have edited or attempted to resend the second message 102 that has the message identifier 202 of "ID2." Accordingly, the payload information 204 displayed in the user interface 118 in association with the second message may continue to present the misspelled attribute name, and the status indicator 208 displayed in the user interface 118 in association with the second message may be "No Retry." If a user uses the edit option 210 to correct the misspelling in the payload information 204 of the second message and selects the retry option 212, the message error recovery system 110 may send the edited version of the second message 102 back to the first asynchronous message delivery system 108A as a retry message 114, and may update the status indicator 208 of the second message 102 displayed in the user interface 118 to be "Processed."

In the example 200 shown in FIG. 2, a third message 102 having a message identifier 202 of "ID3" may have been received from a different second asynchronous message delivery system 108B. The third message 102 may not have contained an error that prevented delivery by the second asynchronous message delivery system 108B, but a message destination 106 of the third message 102 may have been offline or unreachable when the second asynchronous message delivery system 108B attempted to deliver the third message 102. The user interface 118 may initially indicate that the third message has a status indicator 208 of "No Retry." However, if a user determines that the message destination 106 of the third message 102 is back online or has become reachable via a network, such that the second asynchronous message delivery system 108B is now likely to be able to deliver the third message 102, the user may select the retry option 212 associated with the third message 102. Selection of the retry option 212 associated with the third message 102 may cause the message error recovery system 110 to send a copy of the third message 102, as a retry message 114, to the second asynchronous message delivery system 108B, and to update the status indicator 208 of the third message 102 displayed in the user interface 118 to be "Processed."

Overall, a user may use the user interface 118 of the message error recovery system 110 to view information about messages 102 in the retry database 112, to edit those messages 102, and/or to cause the message error recovery system 110 to send retry messages 114 corresponding to the messages 102. Processing of messages 102 by the message error recovery system 110 is described further below with respect to FIG. 3.

Figure 3:
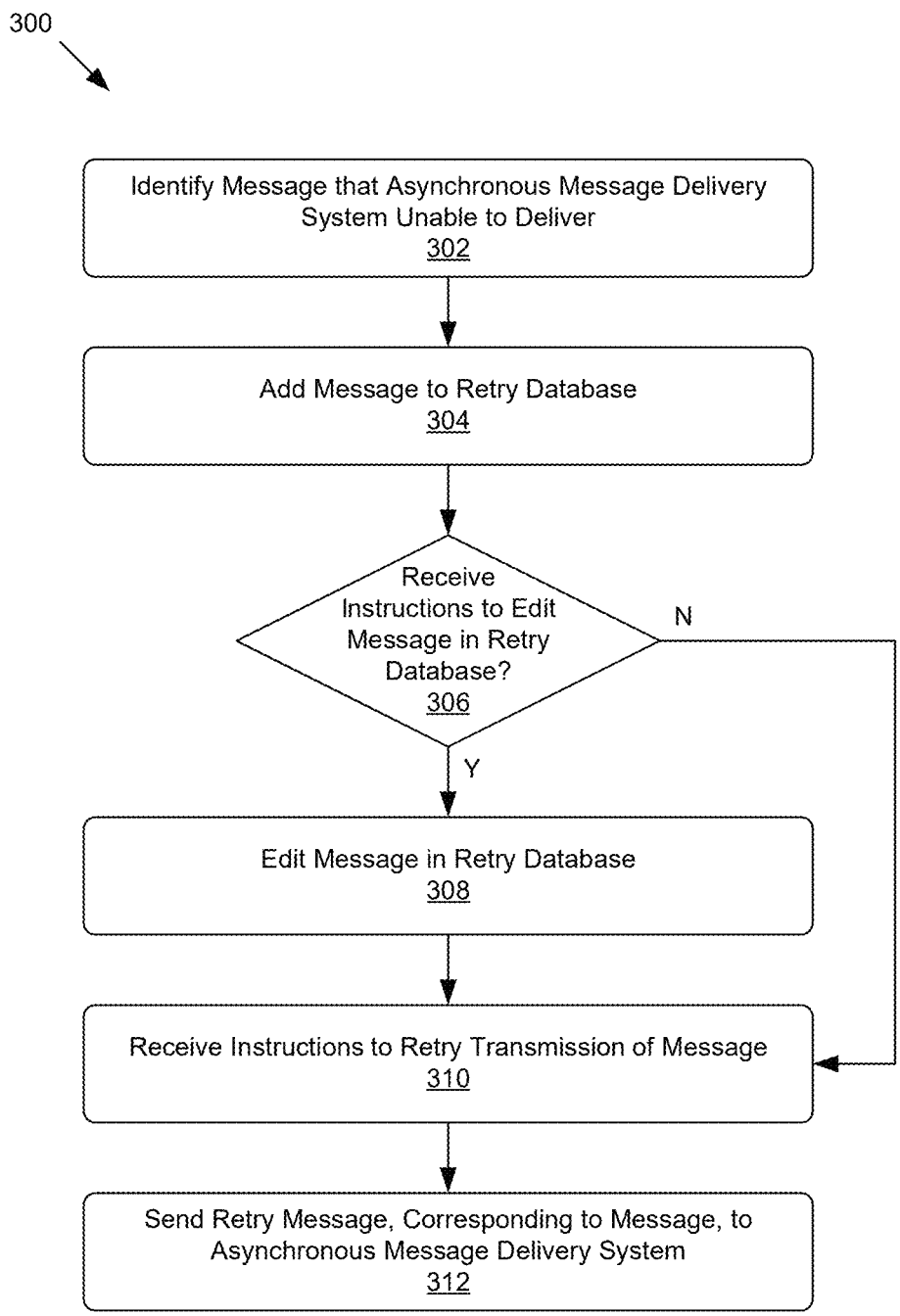
FIG. 3 shows a flowchart illustrating an example method for processing a message via the message error recovery system.

FIG. 3 shows a flowchart illustrating an example method 300 for processing a message 102 via the message error recovery system 110. The method 300 shown in FIG. 3 may be performed by a computing system that executes the message error recovery system 110. An example system architecture for such a computing system is described below with respect to FIG. 4.

At block 302, the computing system may identify a message 102 that an asynchronous message delivery system 108 has been unable to deliver, and will no longer attempt to deliver. In some examples, the message error recovery system 110 executed by the computing system may be configured to monitor a message delivery queue 116, such as a dead-letter queue, of the asynchronous message delivery system 108 to determine when the asynchronous message delivery system 108 adds messages 102 to that message delivery queue 116. For instance, the asynchronous message delivery system 108 may be configured to add a message 102 to a dead-letter queue if the asynchronous message delivery system 108 has been unable to deliver the message 102 after a maximum number of delivery attempts and/or after a maximum amount of time has elapsed. Accordingly, the computing system may monitor the dead-letter queue of the asynchronous message delivery system 108, determine when messages 102 are added to the dead-letter queue, and identify those messages 102 as being undeliverable by the asynchronous message delivery system 108 at block 302.

In other examples, the asynchronous message delivery system 108 may be configured to directly send messages 102 to the message error recovery system 110 when the asynchronous message delivery system 108 determines that those messages 102 are undeliverable. Accordingly, at block 302 the computing system that executes the message error recovery system 110 may receive a message from the asynchronous message delivery system 108, and may identify that message 102 as being undeliverable by the asynchronous message delivery system 108 at block 302.

At block 304, the computing system may add the message 102 identified at block 302 to the retry database 112 of the message error recovery system 110. The message error recovery system 110 may be separate from the asynchronous message delivery system 108, and the retry database 112 may accordingly be a repository of messages 102 that is different from the dead-letter queue and/or other message delivery queues 116 of the asynchronous message delivery system 108.

The computing system may be configured to display information about messages 102 in the retry database 112 via the user interface 118, and/or process the messages 102 in the retry database 112 as described herein. In some examples, the computing system may also generate and send an alert associated with the message 102 added to the retry database 112, for instance at or after a time at which the message 102 is added to the retry database 112 at block 304. For example, the alert generator 120 of the message error recovery system 110 may be configured to generate an alert associated with the added message 102, and to send the alert to one or more users or entities associated with the message source 104 and/or the message destination 106 of the message 102. Such an alert may prompt a user to log in to the message error recovery system 110 and view information about the message 102 via the user interface 118, and/or to investigate or correct the error that may have prevented delivery of the message 102.

At block 306, the computing system may determine if instructions to edit the message 102 stored in the retry database 112 have been received. If such instructions to edit the message 102 have been received (Block 306—Yes), the computing system may edit the message 102 in the retry database 112 based on those instructions at block 308.

In some examples, instructions to edit the message 102 that may be received and used at block 306 and block 308 may be user instructions provided manually as user input via the user interface 118, such as via an edit option 210 or a bulk edit option 216. For example, a user of the user interface 118 may identify an error in the message 102 that may have prevented the asynchronous message delivery system 108 from delivering the message 102, and may provide instructions to edit the message 102 in order to correct the error. The computing system may accordingly edit the message 102 in the retry database 112 based on the user-provided instructions.

In other examples, instructions to edit the message 102 that may be received and used at block 306 and block 308 may be automatic instructions determined by the rule engine 122 based on one or more rules. For example, the rule engine 122 may determine that contents of the message 102 satisfy trigger conditions for a particular rule, for instance if the header and/or payload message 102 contains a particular type of error associated with those trigger conditions. The rule engine 122 may apply the particular rule to automatically determine edit instructions, such as predefined instructions defined by the particular rule, that may edit the message 102 to resolve the particular type of error. The computing system may accordingly edit the message 102 in the retry database 112 based on the edit instructions determined automatically via by the rule engine 122.

After the message 102 is edited at block 308, or if no instructions are received to edit the message 102 (Block 306-No), the computing system may receive instructions to retry transmission of the message 102 at block 310. In some examples, the instructions to retry transmission of the message 102 may be instructions manually provided by a user via the user interface 118, such as user instructions provided via an retry option 212 or a bulk retry option 218.

In other examples, the instructions to retry transmission of the message 102 may be instructions determined automatically by the rule engine 122. As a non-limiting example, if it is likely that the asynchronous message delivery system 108 was unable to deliver the message 102 due to a particular type of error, the rule engine 122 may identify a rule associated with that particular type of error. The rule may indicate that messages 102 associated with that type of error should be automatically retried after three hours, because the particular type of is normally resolved within three hours. Accordingly, the rule engine 122 may apply the rule and automatically generate instructions to retry transmission of the message 102 after three hours have elapsed following a time at which the message 102 was added to the retry database 112 at block 304.

Based on the instructions to retry transmission of the message 102 received at block 310, at block 312 the computing system may send a retry message 114 to the asynchronous message delivery system 108 from which the message 102 was received at block 302. If the message 102 was edited in the retry database 112 at block 308, the retry message 114 sent at block 312 may be a copy of the current edited version of the message 102 in the retry database 112. If the message 102 was not edited in the retry database 112 at block 308, the retry message 114 sent at block 312 may be a copy of the original version of the message 102 that was added to the retry database 112 at block 304.

Because the error that prevented the asynchronous message delivery system 108 from delivering the message 102 may have been resolved, either because the message 102 was edited at block 308 or because the error was externally resolved prior to receipt of the instructions to retry transmission of the message 102 at block 310, the asynchronous message delivery system 108 may be likely to be able to deliver the retry message 114 sent at block 312. Accordingly, although the asynchronous message delivery system 108 had initially been unable to deliver the message 102 to a message destination 106, the original or edited contents of the message 102 may successfully be delivered in the retry message 114 to the message destination 106 via the asynchronous message delivery system 108.

FIG. 4 shows an example system architecture 400 for a computing system 402 that may execute one or more elements described herein, such as the message source 104, the message destination 106, the asynchronous message delivery system 108, and/or the message error recovery system 110. The computing system 402 may include one or more computers, servers, or other types of computing devices. Individual computing devices of the computing system 402 may have the system architecture 400 shown in FIG. 4, or a similar system architecture. In some examples, other computing devices, such as user devices that may access the user interface 118 and/or other elements of the message error recovery system 110, may also have the system architecture 400 shown in FIG. 4, or a similar system architecture.

In some examples, different elements described herein may be distributed among, and/or be executed by, multiple computing systems or devices similar to the computing system 402 shown in FIG. 4. As an example, the message error recovery system 110 may be executed by a different computing system than a computing system that executes the asynchronous message delivery system 108.

In some examples, the computing system 402 may, in some examples, include or be part of a cloud computing environment or other distributed system that hosts and/or executes one or more elements described herein. For instance, in some examples the message error recovery system 110 may be executed by a cloud computing environment, such as a cloud computing environment that is the same as, or different from, a cloud computing environment that separately executes the asynchronous message delivery system 108, one or more message sources 104, and/or one or more message destinations 106. In some examples, servers or other computing devices of such a cloud computing environment may use one or more virtual machines, containers, and/or other systems to execute one or more instances of the message error recovery system 110 and/or other elements described herein.

The computing system 402 may include memory 404. In various examples, the memory 404 may include system memory, which may be volatile (such as RAM), non-volatile (such as ROM, flash memory, etc.) or some combination of the two. The memory 404 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which may be used to store desired information and which may be accessed by the computing system 402. Any such non-transitory computer-readable media may be part of the computing system 402.

The memory 404 may store one or more types of data, computer-executable instructions associated with software elements, firmware elements, or other executable elements, and/or other information associated with elements described herein. As an example, the memory 404 may store data and/or computer-executable instructions associated with the message error recovery system 110, such as the retry database 112, the user interface 118, the alert generator 120, and/or the rule engine 122.

The memory 404 may also store other modules and data 406 that may be utilized by the computing system 402 to perform or enable performing any action taken by the computing system 402. For example, the other modules and data 406 may include a platform, operating system, and/or applications, as well as data utilized by the platform, operating system, and/or applications.

The computing system 402 may also have processor(s) 408, communication interfaces 410, a display 412, output devices 414, input devices 416, and/or a drive unit 418 including a machine readable medium 420.

In various examples, the processor(s) 408 may be a central processing unit (CPU), a graphics processing unit (GPU), both a CPU and a GPU, or any other type of processing unit. Each of the one or more processor(s) 408 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 408 may also be responsible for executing computer applications stored in the memory 404, which may be associated with types of volatile (RAM) and/or nonvolatile (ROM) memory.

The communication interfaces 410 may include transceivers, modems, network interfaces, antennas, and/or other components that may transmit and/or receive data over networks or other connections. In some examples, the communication interfaces 410 may be used to exchange data between elements described herein. As an example, the communication interfaces 410 may be used by the message error recovery system 110 to receive messages 102 from one or more asynchronous message delivery systems 108, and/or to send corresponding retry messages 114 back to the one or more asynchronous message delivery systems 108. As another example, the communication interfaces 410 may allow a user device to access and interact with the user interface 118 of the message error recovery system 110, for instance via the Internet or another network connection.

The display 412 may be a liquid crystal display, or any other type of display commonly used in computing devices. For example, a display 412 may be a touch-sensitive display screen, and can then also act as an input device or keypad, such as for providing a soft-key keyboard, navigation buttons, or any other type of input.

The output devices 414 may include any sort of output devices known in the art, such as the display 412, speakers, a vibrating mechanism, and/or a tactile feedback mechanism. Output devices 414 may also include ports for one or more peripheral devices, such as headphones, peripheral speakers, and/or a peripheral display.

The input devices 416 may include any sort of input devices known in the art. For example, input devices 416 may include a microphone, a keyboard/keypad, and/or a touch-sensitive display, such as a touch-sensitive display screen. A keyboard/keypad may be a push button numeric dialing pad, a multi-key keyboard, or one or more other types of keys or buttons, and may also include a joystick-like controller, designated navigation buttons, or any other type of input mechanism.

The machine readable medium 420 may store one or more sets of instructions, such as software or firmware, that embodies any one or more of the methodologies or functions described herein. The instructions may also reside, completely or at least partially, within the memory 404, processor(s) 408, and/or communication interface(s) 410 during execution thereof by the computing system 402. The memory 404 and the processor(s) 408 also may constitute machine readable media 420.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
    identifying, by a message error recovery system executed by a computing system comprising a processor, a message that an asynchronous message delivery system, different from the message error recovery system, is unable to deliver to a message destination due to an error;
    adding, by the message error recovery system, the message to a retry database;
    receiving, by the message error recovery system, instructions to retry transmission of the message based on resolution of the error; and
    sending, by the message error recovery system, and based on the instructions, a retry message corresponding to the message to the asynchronous message delivery system,
        wherein the asynchronous message delivery system delivers the retry message to the message destination based on the resolution of the error.

2. The computer-implemented method of claim 1, further comprising displaying, by the message error recovery system, a user interface that presents information associated with the message based on the retry database.

3. The computer-implemented method of claim 2, wherein the error is a content error or a formatting error in the message, and the method further comprises:
    receiving, by the message error recovery system, and via the user interface, edit instructions to edit the message in the retry database; and
    editing, by the message error recovery system, the message in the retry database based on the edit instructions, wherein:
        the editing of the message based on the edit instructions resolves the content error or the formatting error in the message, and
        the retry message is an edited version of the message in the retry database based at least in part on the editing of the message.

4. The computer-implemented method of claim 2, wherein:
    the user interface presents instances of the information associated with a set of messages stored in the retry database, and
    the message error recovery system received the set of messages from a set of one or more asynchronous message delivery systems that includes the asynchronous message delivery system.

5. The computer-implemented method of claim 4, wherein the instances of the information presented in the user interface comprise status information indicating whether the message error recovery system has sent retry messages corresponding to individual messages of the set of messages.

6. The computer-implemented method of claim 4, wherein the user interface is configured to:
    receive a user selection of a group of selected messages from among the set of messages, and receive user instructions to at least one of:
bulk edit the group of selected messages, or
send a group of retry messages corresponding to the group of selected messages.

7. The computer-implemented method of claim 1, wherein:
the error is a content error or a formatting error in the message,
the method further comprises automatically editing, by the message error recovery system, and via a rule engine, the message in the retry database based on at least one predefined rule that applies to the content error or the formatting error,
the editing of the message based on the at least one predefined rule resolves the content error or the formatting error in the message, and
the retry message is an edited version of the message in the retry database based at least in part on the editing of the message.

8. The computer-implemented method of claim 1, wherein:
the error is based on the message destination being unreachable by the asynchronous message delivery system at a first time at which the asynchronous message delivery system attempted to deliver the message to the message destination, and
the resolution of the error is based on a determination that, at a second time, the message destination has become reachable.

9. The computer-implemented method of claim 8, wherein the instructions to retry the transmission of the message are user instructions received via a user interface of the message error recovery system.

10. The computer-implemented method of claim 8, wherein the instructions to retry the transmission of the message are automatic instructions determined via a rule engine of the message error recovery system based on at least one predefined rule.

11. The computer-implemented method of claim 1, further comprising sending, by the message error recovery system, an alert to at least one entity based on the adding of the message to the retry database, wherein the at least one entity is associated with one or more of the message destination or a message source that sent the message to the asynchronous message delivery system.

12. The computer-implemented method of claim 1, wherein:
the message error recovery system identifies the message by monitoring a dead-letter queue or other undeliverable queue of the asynchronous message delivery system, and
the asynchronous message delivery system is configured to add the message to the dead-letter queue or the other undeliverable queue based on a determination that the asynchronous message delivery system is unable to deliver the message to the message destination and that the asynchronous message delivery system is not configured to make any further attempts to deliver the message to the message destination.

13. A computing system, comprising:
one or more processors, and
memory storing computer-executable instructions associated with a message error recovery system that, when executed by the one or more processors, cause the one or more processors to:
identify a message that an asynchronous message delivery system, different from the message error recovery system, is unable to deliver to a message destination due to an error;
add the message to a retry database of the message error recovery system;
display a user interface that presents information associated with the message based on the retry database;
receive instructions, via the user interface, to retry transmission of the message based on resolution of the error; and
send, based on the instructions, a retry message corresponding to the message to the asynchronous message delivery system,
wherein the asynchronous message delivery system delivers the retry message to the message destination based on the resolution of the error.

14. The computing system of claim 13, wherein:
the error is a content error or a formatting error in the message,
the computer-executable instructions cause the one or more processors to:
receive edit instructions, via the user interface, that correct the content error or the formatting error in the message; and
edit the message in the retry database based on the edit instructions, and
the retry message is an edited version of the message in the retry database based at least in part on editing of the message.

15. The computing system of claim 13, wherein:
the user interface presents instances of the information associated with a set of messages stored in the retry database, and
the message error recovery system received the set of messages from a set of one or more asynchronous message delivery systems that includes the asynchronous message delivery system.

16. The computing system of claim 13, wherein:
the computer-executable instructions cause the one or more processors to send an alert to at least one entity based on adding of the message to the retry database, and
the at least one entity is associated with one or more of the message destination or a message source that sent the message to the asynchronous message delivery system.

17. One or more non-transitory computer-readable media storing computer-executable instructions associated with a message error recovery system that, when executed by one or more processors of a computing system, cause the one or more processors to:
identify a message that an asynchronous message delivery system, different from the message error recovery system, is unable to deliver to a message destination due to an error;
add the message to a retry database of the message error recovery system;
display a user interface that presents information associated with the message based on the retry database;
receive instructions, via the user interface, to retry transmission of the message based on resolution of the error; and
send, based on the instructions, a retry message corresponding to the message to the asynchronous message delivery system, wherein the asynchronous message delivery system delivers the retry message to the message destination based on the resolution of the error.

18. The one or more non-transitory computer-readable media of claim 17, wherein:
the error is a content error or a formatting error in the message,
the computer-executable instructions cause the one or more processors to:
receive edit instructions, via the user interface, that correct the content error or the formatting error in the message; and
edit the message in the retry database based on the edit instructions, and
the retry message is an edited version of the message in the retry database based at least in part on editing of the message.

19. The one or more non-transitory computer-readable media of claim 17, wherein:
the user interface presents instances of the information associated with a set of messages stored in the retry database, and
the message error recovery system received the set of messages from a set of one or more asynchronous message delivery systems that includes the asynchronous message delivery system.

20. The one or more non-transitory computer-readable media of claim 17, wherein:
the computer-executable instructions cause the one or more processors to send an alert to at least one entity based on adding of the message to the retry database, and
the at least one entity is associated with one or more of the message destination or a message source that sent the message to the asynchronous message delivery system.

* * * * *